United States Patent [19]
Oosawa

[11] Patent Number: 5,133,433
[45] Date of Patent: Jul. 28, 1992

[54] ROTARY DAMPER
[75] Inventor: Takafusa Oosawa, Shizuoka, Japan
[73] Assignee: Nihon Plast Co., Ltd., Japan
[21] Appl. No.: 631,486
[22] Filed: Dec. 21, 1990

[30] Foreign Application Priority Data

Dec. 26, 1989 [JP] Japan ............................. 1-149645[U]
Sep. 19, 1990 [JP] Japan ............................. 2-98415[U]

[51] Int. Cl.[5] .................................................. F16D 57/00
[52] U.S. Cl. ..................................... 188/290; 267/201;
267/273; 267/155; 74/574
[58] Field of Search ............... 188/290; 267/201, 202,
267/275, 155, 26, 273; 16/65, 75, 76, 85, 80,
307, 308, 342, DIG. 10; 312/319

[56] References Cited

U.S. PATENT DOCUMENTS

| 208,770 | 10/1878 | Spruce | 16/307 |
|---|---|---|---|
| 1,399,795 | 12/1921 | Reif | 267/9 |
| 1,585,797 | 5/1926 | Starkey | 188/130 |
| 3,376,088 | 4/1968 | Bol et al. | 312/319 |
| 4,428,480 | 1/1984 | Ackeret | 312/319 |
| 4,576,252 | 3/1986 | Omata | 185/39 |
| 4,616,737 | 10/1986 | Orii | 188/184 |
| 4,635,763 | 1/1987 | Omata | 312/319 |
| 4,830,151 | 5/1989 | Numata | 188/290 |
| 4,833,938 | 5/1989 | Reinwall et al. | 74/574 |

FOREIGN PATENT DOCUMENTS

| 62-81739 | 5/1987 | Japan . | |
| 62-124343 | 8/1987 | Japan . | |
| 0999580 | 7/1965 | United Kingdom | 16/342 |

Primary Examiner—Robert J. Oberleitner
Assistant Examiner—Chris Schwartz
Attorney, Agent, or Firm—Ronald P. Kananen

[57] ABSTRACT

A rotary damper has a hollow cylinder having upper and lower flanges to serve as a pivot. One arm is tightly fitted on one of the upper and lower flanges and extends essentially in a direction tangential to the associated flange. The other arm is pivotal with rotation of the outer pivot and extends essentially in a direction tangential to the outer pivot. A coil spring is wound around the outer periphery of the hollow cylinder. The ends of the coil spring are connected to the arms for exerting spring force in a direction opposite the pivoting direction of the arms.

11 Claims, 4 Drawing Sheets

FIG. 3
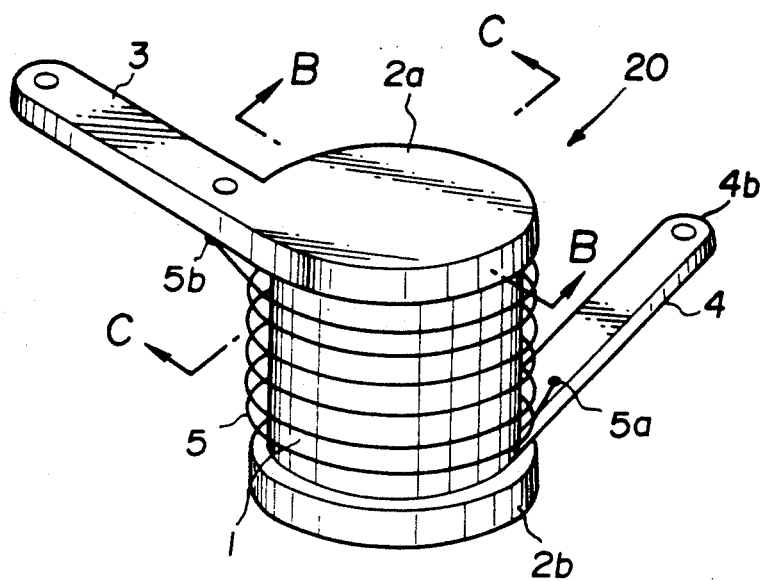
FIG. 4                FIG. 5
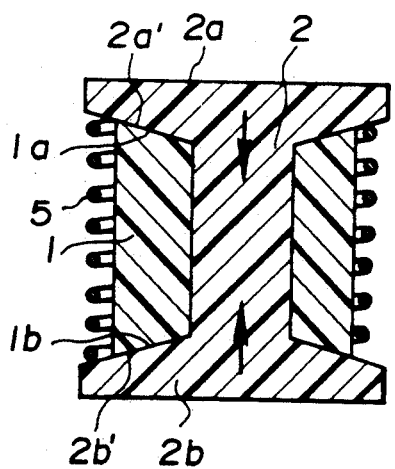    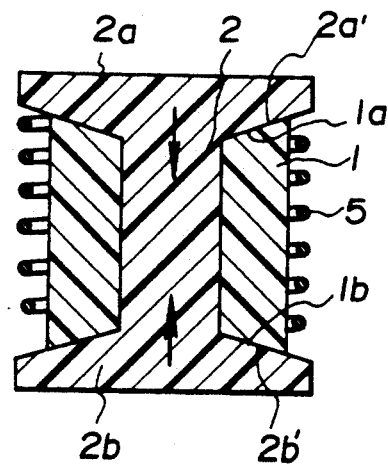

ROTARY DAMPER

BACKGROUND OF THE INVENTION

1. Field of the Invention

The present invention relates generally to a rotary damper which progressively or gradually reduces rotational torque in a rotating component of various devices. More specifically, the invention relates to a rotary damper which is easy to manufacture.

2. Description of the Background Art

A conventionally proposed rotary damper employing a coil spring has been disclosed in Japanese Utility Model First (unexamined) Publications (Jikkai) Showa 62-81739 and 62-124343. In such prior proposed construction, a viscous fluid is filled in a cylinder for preventing abrupt variation of the rotating torque with viscous resistance of the fluid. To maintain the viscous fluid, the cylinder has to be formed with substantially high accuracy for establishing a liquid tight seal. The requirement for high accuracy necessarily requires high production cost.

SUMMARY OF THE INVENTION

It is an object of the present invention to provide a rotary damper which can reduce production cost.

In order to accomplish aforementioned and other objects, a rotary damper, according to the present invention, has a pivot assembly including coaxially arranged inner and outer pivots. The inner pivot has upper and lower flanges to serve as a pivot. One arm is tightly fitted on one of the upper and lower flanges and extends essentially in tangential direction of the associated flange. The other arm is pivotal with rotation of the outer pivot and extends essentially in a tangential direction from the outer pivot. A coil spring is wound around the outer periphery of the hollow cylinder. The ends of the coil spring are connected to the arms for exerting spring force in a direction opposite the pivoting direction of the arms.

According to one aspect of the invention, a rotary damper comprises:

first and second cylindrical shafts arranged in coaxial fashion;

a first arm connected to the first cylindrical shaft for pivotal movement, causing rotational movement of the first cylindrical shaft;

a second arm connected to the second cylindrical shaft for pivotal movement, causing rotational movement of the second cylindrical shaft; and a coil spring disposed between the first and second arms for loading spring force for relative movement therebetween; and friction means, disposed between the first and second cylindrical shafts for establishing frictional engagement between the first and second cylindrical shafts for permitting restricted magnitude of slipping movement between the first and second cylindrical shafts.

The friction means may comprises tapered mating surfaces of the first and second cylindrical shafts, which tapered mating surfaces establish tight frictional engagement with each other. On the other hand, the second arm is detachable from the second cylindrical shaft.

According to another aspect of the invention, a container slidably disposed in a housing, comprises:

a guide associated with the container for guiding thrusting movements of the container between a projected position to externally expose a container space and a retracted position to be placed within the housing for preventing the container space from being accessed; and a damper assembly associated with the container, which comprises first and second cylindrical shafts arranged in coaxial fashion;

a first arm connected to the first cylindrical shaft for pivotal movement causing rotational movement of the first cylindrical shaft;

a second arm connected to the second cylindrical shaft for pivotal movement, causing rotational movement of the second cylindrical shaft; and a coil spring disposed between the first and second arms for loading spring force for relative movement therebetween; and friction means, disposed between the first and second cylindrical shafts shafts for establishing frictional engagement between the first and second cylindrical shafts for permitting restricted magnitude of slipping movement between the first and second cylindrical shafts.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 3 is an enlarged perspective view of the rotary damper of the invention;

FIGS. 4 and 5 are sections respectively taken along lines B—B and C—C in FIG. 3;

DESCRIPTION OF THE PREFERRED EMBODIMENT

Figure 1:
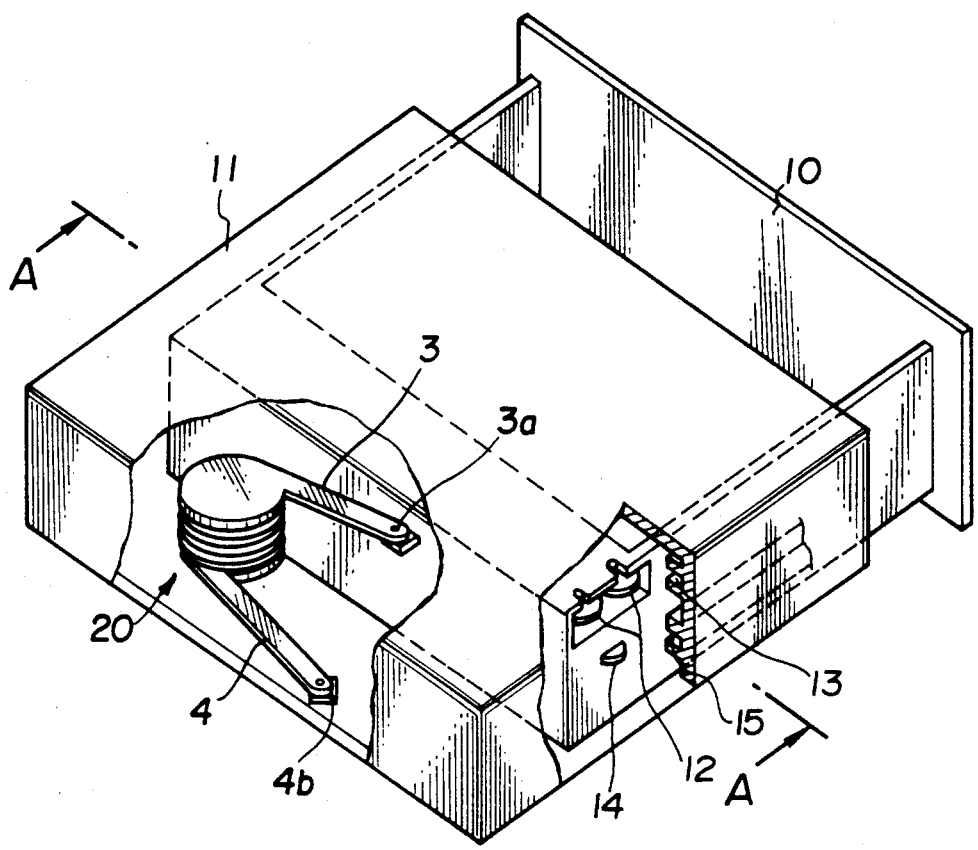
FIG. 1 is a perspective view of the preferred embodiment of a rotary damper applied for a drawer type box housed in a casing as one example of application of the invention.
Figure 2:
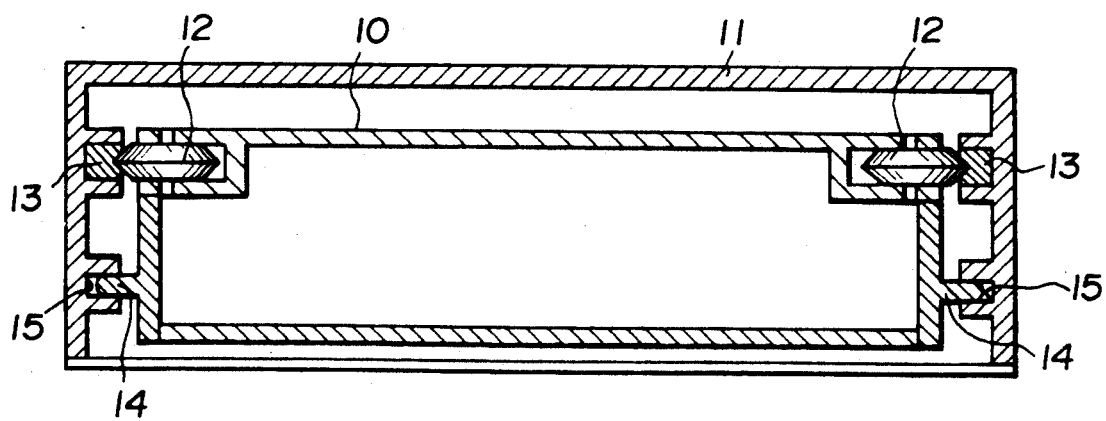
FIG. 2 is a section taken along line A—A in FIG. 1.

Referring now to the drawings, particularly to FIG. 1, the preferred embodiment of a rotary damper, according to the present invention, will be discussed herebelow in terms of an application for a drawer type box assembly. Such a drawer type box assembly can be used in an automotive instrument panel as a coin pocket and so forth. The drawer type box assembly includes a sliding box 10 thrustingly housed within a hollow box shaped housing 11. The box 10 has a plurality of rollers 12 associated with guide rails 13. The box 10 also has guide projections 14 slidingly engaged with guide grooves 15 formed on the inner periphery of the housing 11.

The box 10 is movable between a projected position projecting from the front mouth of the housing 11, and a retracted position to be placed within the housing 11.

In the retracted position, the box 10 is latched or locked by means of a latching or locking means (not shown). Preferably, the locking means may be a toggle type lock which can be released by slightly depressing the box 10 in the retracting direction.

A rotary damper assembly 20 is disposed in the housing 11 in the vicinity of the rear end of the internal space of the housing 11. The rotary damper assembly 20 is associated with the box 10 for exerting biasing force so that the box can be driven from the retracted position to the projected position in response to releasing of locking by the locking means. The rotary damper assembly 20 is designed for reducing the biasing force to be exerted on the box according to travel of the box from the retracted position to the projected position.

The rotary damper-assembly 20 includes a hollow cylinder 1 which has tapered upper and lower ends 1a and 1b. A pivot shaft 2 is rotatably received within the interior space of the cylinder 1. The pivot shaft 2 has upper and lower flanges 2a and 2b extending from upper and lower ends of the cylinder 1. The upper and lower flanges 2a and 2b have tapered surfaces 2a' and 2b' mating with the tapered ends 1a and 1b. The taper angles of the tapered surfaces 2a' and 2b' are formed in conformance with that of the tapered ends 1a and 1b of the cylinder 1 for tight fitting.

In production, the cylinder 1 is formed of a synthetic resin, such as ABS resin and so forth, through an injection process. Then, the cylinder 1 thus formed is inserted in a molding for forming the pivot shaft 2. The pivot shaft 2 is formed of a synthetic resin material having high thermal contractibility and lower melting point, such as polypropylene and so forth, than the material of the cylinder 1. With the molten material for the pivot shaft 2, injection molding is performed for forming the pivot shaft with the upper and lower flanges 2a and 2b.

Upper arm 3 is integrally formed with the upper flange 2a for pivotal movement therewith. The upper arm 3 extends from the flange 2a in essentially tangential direction thereof. On the other hand, a lower arm 4 is formed integrally with the cylinder 1. The lower arm 4 is extended from the lower end of the cylinder 1 to position the lower surface flush with the lower flange 2b. The lower arm 4 extends in essentially tangential direction.

A coil spring 5 is wound around the cylinder 1. The upper side end 5b of the coil spring 5 is connected to the upper arm 3. On the other hand, the lower side end 5a of the coil spring 5 is connected to the lower arm 4. The coil spring 5 is designed for driving the arms 3 and 4 to pivotally move to increase the offset angles to each other. Namely, the spring force of the coil spring 5 is held accumulated when the arms 3 and 4 are oriented substantially in a parallel relationship to each other. On the other hand, the mating tapered surfaces 1a, 2a and 1b, 2b generate frictional force resisting relative angular displacement between the cylinder 1 and the pivot shaft 2. Therefore, when the arms 3 and 4 are driven to increase the offset angle, the friction force generated between the tapered surfaces 1a, 2a and 1b, 2b of the cylinder 1 and the pivot shaft 2 restrains the speed of pivotal movement of the arms 3 and 4.

In the shown embodiment, the lower arm 4 is connected to the housing 11 at the free end thereof 4b. Therefore, the free end of the arm section 4b serves as a stationary point of the rotary damper 20. On the other hand, the upper arm 3 is connected to the drawer type box 10 at a free end 3a thereof. When the lock of the locking means is released, the arms 3 and 4 become free from restriction and thus are driven by the spring force of the coil spring 5. In this embodiment, the rotational torque of the spring causes counterclockwise pivotal movement of the upper arm 3 together with the pivot shaft 2. At the same time, a closkwise torque is then exerted on the lower arm 4. Since a free end 4a of the arm 4 is stationarily fixed on the housing 11, the reacting force is exerted on the lower arm 4. As a result, the pivot shaft 2 with the cylinder 1 and the coil spring 5 are driven frontwardly. By the frontward movement of the pivot shaft 2 and by the counterclockwise pivotal movement of the arm 3, the drawer type box 10 is driven frontward to the projected position.

As can be appreciated, the spring force accumulated in the coil spring 5 is gradually reduced according to frontward stroke of movement of the box 10. Simultaneously, during the foregoing movement, the friction between the mating surfaces 1a, 2a and 1b, 2b resist rotational movement of the pivot shaft 2 relative to the cylinder 1. Therefore, the speed of extraction of the drawer type box 10 can be controlled so that extraction cannot be done at excessive speed.

While the present invention has been discussed in terms of the preferred embodiment of the invention, the invention should not be specified to the shown embodiment but can be implemented in various constructions. Therefore, the invention should be understood to include all possible embodiments and modifications which can be implemented without departing from the principle of the invention.

Figure 6:
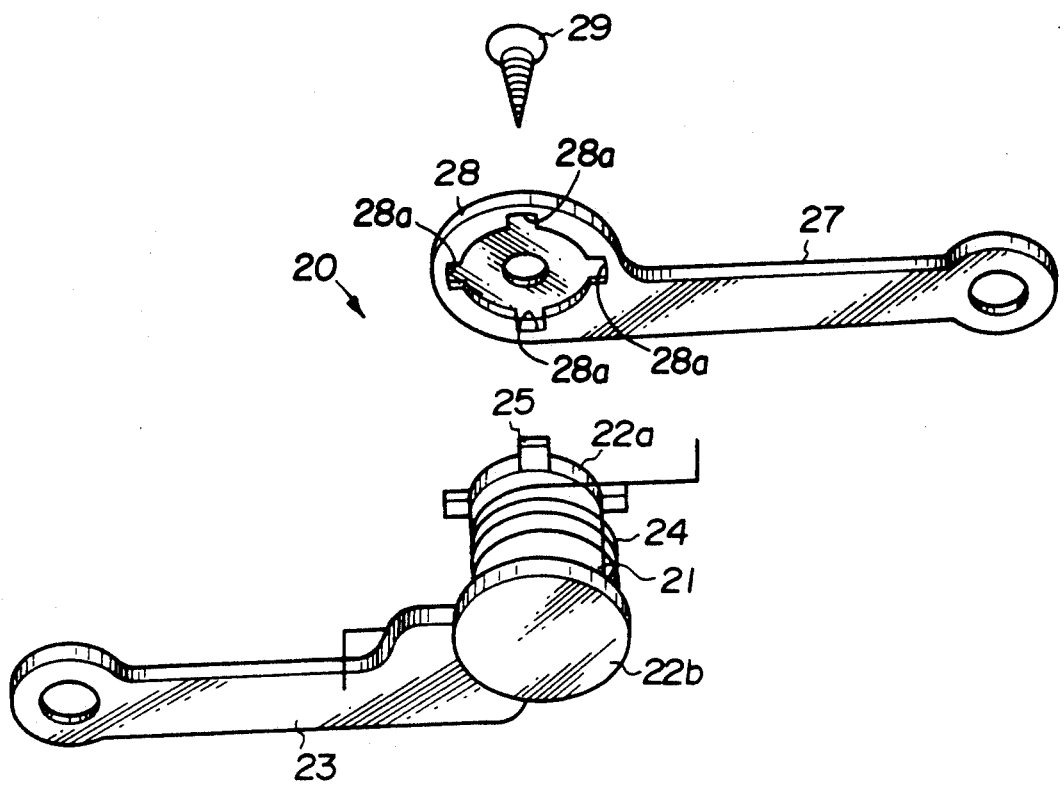
FIG. 6 is an exploded perspective view of a modified construction of the rotary damper according to the invention.
Figure 7:
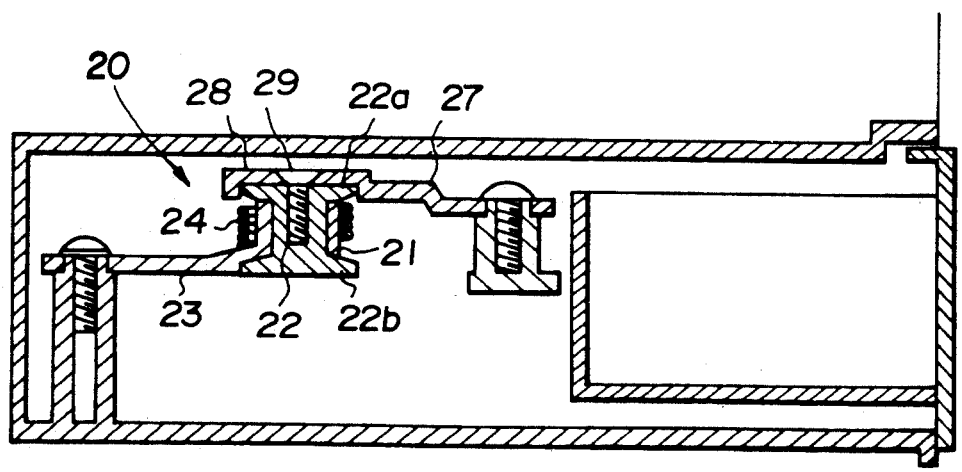
FIG. 7 is an enlarged section of the modified embodiment of the rotary damper in FIG. 6.
Figure 8:
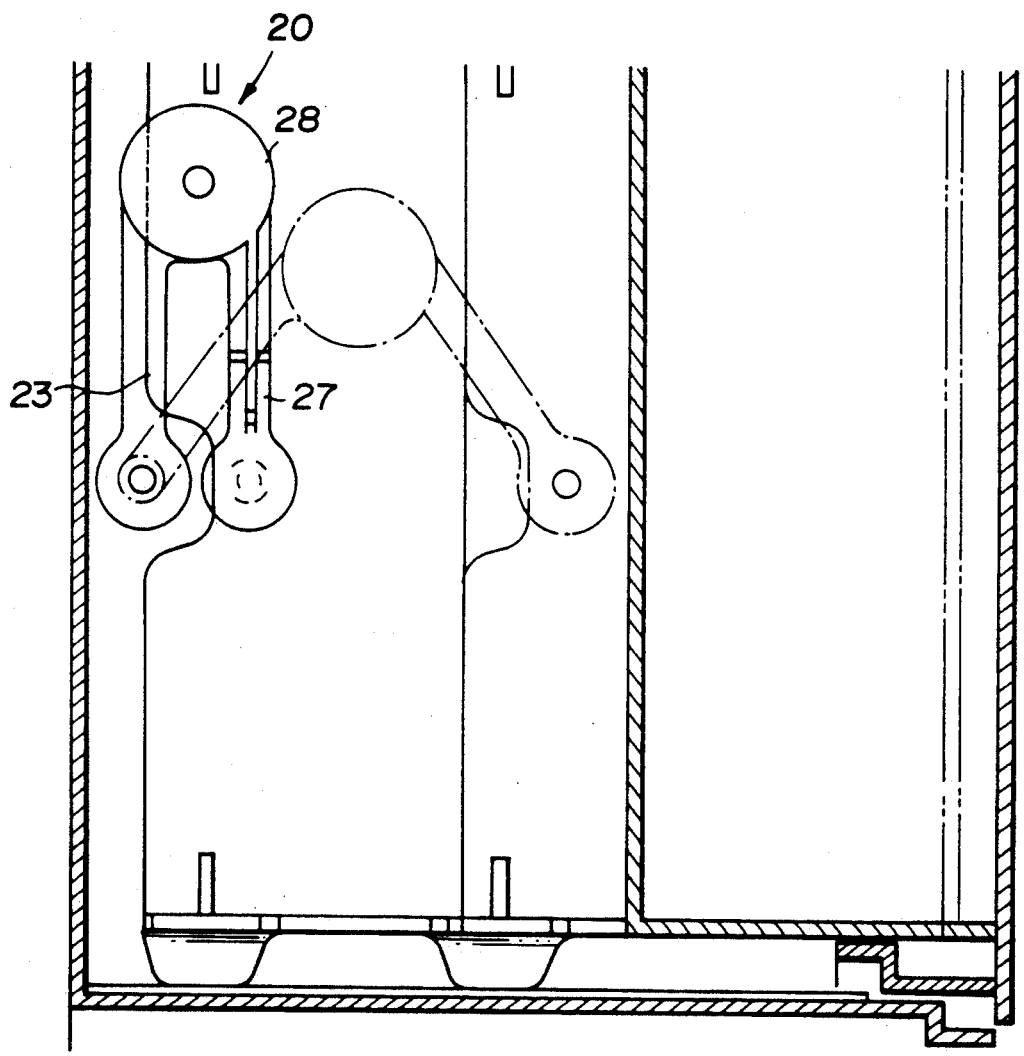
FIG. 8 is an enlarged plan view of the modified embodiment of the rotary damper, in which is shown the rotary damper in an operating condition.

FIGS. 6 through 8 show a modification of the foregoing embodiment of the present invention. In this embodiment, a cylinder 21 is formed integrally with a lower arm 23. A pivot shaft 22 extends through the interior space of the cylinder 21. The flanges 22a and 22b are formed in the same manner as that illustrated in terms of the former embodiment. As can be seen from FIG. 6, the upper flange 22a includes a plurality of radial projections 25 which is designed to engage with radial groove sections 28a of the pivot section 28 of an upper pivotal arm 27. As shown, the upper arm 27 is secured to the pivot shaft 22 by a screw 29.

With the shown embodiment, substantially the same operation as that discussed with respect to this former embodiment can be achieved. Furthermore, in the embodiment, since the spring can be installed before the upper arm 27 is fitted to the upper end of the pivot shaft, assembling operation becomes easier.

What is claimed is:

1. A rotary damper comprising:
   a first cylindrical shaft made of a first plastic material;
   a second cylindrical shaft arranged in coaxial fashion with and for rotation relative to said first cylindrical shaft, said second cylindrical shaft being made of a second plastic material, said first and second plastic materials having different melting points and different thermal contractibilities, respectively;
   a first arm connected to said first cylindrical shaft for a unitary rotational motion therewith;
   a second arm connected to said second cylindrical shaft for a unitary rotational motion therewith;
   a spring operatively connected to said first and second arms; and
   a friction mechanism including a set of frictionally and slidably engaged portions which are fixed to said first and second cylindrical shafts, respectively, said friction mechanism being so constructed and arranged such that, when said first and second arms are subject to a force in a rotational direction, said set of frictionally and slidably engaged portions slide to generate resistance to rotational motion of said first arm relative to said second arm.

2. A rotary damper as claimed in claim 1, wherein said first an second cylindrical shafts have tapered mating portions mutually engaged with each other to serve as said set of frictionally and slidably engaged portions of said friction mechanism.

3. A rotary damper as claimed in claim 1, wherein said second arm is detachably connected to said second cylindrical shaft.

4. A rotary damper as claimed in claim 1, wherein said second cylindrical shaft includes projections, and said second arm includes groove means for receiving said projections.

5. A rotary damper comprising:
a cylinder having an inner space and cylindrical wall means defining said inner space;
a shaft rotatably received in slidable engagement with said cylindrical wall means for rotational motion relative to said cylinder about an axis, said shaft including a first radially extending flange and a second radially extending flange spaced along said axis;
said cylinder having a first axial end and a second axial end which are in engagement with said first and second radially extending flanges, respectively;
a first arm connected to said shaft for a unitary rotational motion about said axis;
a spring encircling said cylinder and having one end anchoring said first arm and an opposite end anchoring said second arm; and
a friction mechanism including two sets of frictionally and slidably engaged mating surface portions, one set defining an interface between said first radially extending flange and said first axial end, the other set defining an interface between said second radially extending flange and said second axial end, said friction mechanism being so constructed and arranged such that, when said first and second arms are subject to a force in a rotational direction, said two sets of frictionally and slidably engaged surface portions slide to generate a resistance to rotational motion of said shaft relative to said cylinder about said axis.

6. A rotary damper as claimed in claim 5, wherein said cylinder is made of a first plastic material having a first thermal contractibility and a first melting point, and said shaft is made of a second plastic material having a second thermal contractibility higher than said first thermal contractibility and a second melting point lower than said first melting point.

7. A rotary damper as claimed in clain 6, wherein said shaft is formed using said cylinder as a mold.

8. A rotary damper as claims in claim 7, wherein said first and second arms are integral with said shaft and said cylinder.

9. A rotary damper as claimed in claim 7, wherein said first arm is integral with said first radially extending flange of said shaft.

10. A rotary damper as claimed in claim 6, wherein said first radially extending flange is formed with a plurality of radially extending projections, and said first arm including groove means for receiving said plurality of radially extending projections.

11. An assembly comprising:
a housing;
a container in said housing and movable between a retracted position wherein said container is retracted into said housing and a projected position wherein said container is projected from said housing;
guide means for guiding said container for movements between said retracted and projected positions;
a first cylindrical shaft made of a first plastic material;
a second cylindrical shaft arranged in coaxial fashion with and for rotation relative to said first cylindrical shaft, said second cylindrical shaft being made of a second plastic material, said first and second plastic materials having different melting points and different thermal contractibilities, respectively;
a first arm connected to said first cylindrical shaft for a unitary rotational motion therewith;
a second arm connected to said second cylindrical shaft for a unitary rotational motion therewith, said first and second arms being operatively connected to said housing and said container;
a spring operatively connected to said first and second arms; and
a friction mechanism including a set of frictionally and slidably engaged portions which are fixed to said first and second cylindrical shafts, respectively, said friction mechanism being so constructed and arranged such that, when said first and second arms are subject to a force in a rotational direction, said set of frictionally and slidably engaged portions slide to generate a resistance to rotational motion of said first arm relative to said second arm.

* * * * *